(12) United States Patent
Shadich

(10) Patent No.: US 8,301,682 B2
(45) Date of Patent: Oct. 30, 2012

(54) DIVIDER FOR FIXED POINT DIVISION

(75) Inventor: Refik Shadich, Christchurch (NZ)

(73) Assignee: Tait Electronics Limited, Christchurch (NZ)

( * ) Notice: Subject to any disclaimer, the term of this patent is extended or adjusted under 35 U.S.C. 154(b) by 1528 days.

(21) Appl. No.: 10/546,697

(22) PCT Filed: Feb. 24, 2004

(86) PCT No.: PCT/NZ2004/000036
§ 371 (c)(1),
(2), (4) Date: Jan. 10, 2008

(87) PCT Pub. No.: WO2004/075043
PCT Pub. Date: Sep. 2, 2004

(65) Prior Publication Data
US 2008/0140744 A1   Jun. 12, 2008

(30) Foreign Application Priority Data
Feb. 24, 2003   (NZ) ........................................ 524378

(51) Int. Cl.
*G06F 7/52* (2006.01)
(52) U.S. Cl. ...................................................... 708/655
(58) Field of Classification Search ........... 708/650–656
See application file for complete search history.

(56) References Cited

U.S. PATENT DOCUMENTS

| | | | |
|---|---|---|---|
| 4,594,680 A | 6/1986 | Schomburg et al. | |
| 4,692,891 A | 9/1987 | Yamaoka et al. | |
| 4,891,730 A | 1/1990 | Saddow et al. | |
| 4,891,780 A * | 1/1990 | Miyoshi | 708/655 |
| 4,992,969 A * | 2/1991 | Yamahata | 708/650 |
| 6,115,733 A * | 9/2000 | Oberman et al. | 708/654 |
| 6,282,556 B1 * | 8/2001 | Chehrazi et al. | 708/521 |
| 2003/0220958 A1 | 11/2003 | Aldridge et al. | |
| 2004/0167956 A1* | 8/2004 | Vihriala | 708/654 |

FOREIGN PATENT DOCUMENTS

| | | |
|---|---|---|
| EP | 0351242 | 1/1990 |
| WO | WO 95/19006 | 7/1995 |
| WO | WO 97/45787 | 12/1997 |

OTHER PUBLICATIONS

J.A.N. Lee, Binary Division by Shift and Subtract, 2000, http://courses.cs.vt.edu, pp. 1-2.*

Darrell W. Homing and Rulph Chassaing, IIR Filter Scaling for Real-Time Signal Processing, IEEE Transactions on Education. vol. 34, No. I . Feb. 1991, pp. 108-112.* http://hsc.csu.edu.au/sdd/options/view/data_rep/binarydivision.html.

\* cited by examiner

*Primary Examiner* — Chat Do
*Assistant Examiner* — Kevin G Hughes
(74) *Attorney, Agent, or Firm* — Dann, Dorfman, Herrell and Skillman, P.C.

(57) ABSTRACT

The present invention relates to a divider for dividing a dividend by a divisor. The divider includes a subtractor for subtracting the divisor from the dividend to produce a result, storage space with a preliminary answer, and a processor for revising the dividend and preliminary answer based on the result. Each interation the divider is adapted to reiterate the subtraction and revision multiple times, based on a revised dividend and revised preliminary answer.

12 Claims, 3 Drawing Sheets

4 bit division – Example 1

$2^4 = 16 \quad \Rightarrow \quad \dfrac{1}{2^n-1} = \dfrac{1}{2^4-1} = \dfrac{1}{15}$  Quantisation $\therefore$ eg $\dfrac{0.4}{0.6} = 0.666$ $\dfrac{0.4}{0.6} \times \dfrac{15}{15} = \dfrac{6}{9} \quad \Rightarrow \text{binary} \quad \dfrac{0110}{1001}$ $0.666 \times 15 = 10 \quad \Rightarrow \text{binary} = 1010$

```
Q    =   0110 ← LS, Q 1100  (D = 0000)
Div  =   1001

Q           1100
Div         1001
2'sC        0111
2's C Ans   1011
Sub (Q-Div) 0011       No O/F → 1   D = 0001

) LS

Q           0110
Div         1001
2'sC        0111
2'sC Ans    0011   ) LS   O/F → 0   D = 0010

Q           1100
Div         1001
2's C       0111
2's C Ans   0011
Sub (Q-Div) 0011   →      No O/F → 1   D = 0101

) LS

Q           0110
Div         1001
2's C       0111
2's C Ans   1101          O/F → 0   D = 1010   Ans
Sub (Q-Div) 0011
```

FIGURE 2

DIVIDER FOR FIXED POINT DIVISION

FIELD OF THE INVENTION

The present invention relates to a divider and method for implementing division of two numbers. More particularly, it relates to a divider that can be implemented with efficient use of logic cells. In addition, the invention can be adapted to carry out division to an arbitrary level of precision.

BACKGROUND TO THE INVENTION

Digital dividers for carrying out division of two values, generally in binary form, are implemented in various manners for a wide range of applications, such as telecommunications equipment. For example, algorithms that implement frequency lock loops and receivers in telecommunications equipment use digital dividers for division of real values. These values are often represented as quantised integer values. One such representation scheme is known as "fixed point Q15", which provides a 16 bit presentation of real-world signal values. In Q15, 0 (zero) bits are used to present the value on the left-hand side of the decimal point, fifteen bits are used to present values on the right-hand side of the decimal point, and one bit is used for the sign (+/−). Q15 presentation assumes that real signal values are presented in range of (−1,1), and the quantised values are in steps of 1/32767 (that is, $\frac{1}{2}^{15}$). The algorithms assume that all values that require division are decimal, in the range of −1 to 1. The arithmetic operation of division takes two input values in this range, one a dividend and the other a divisor, and produces a result or quotient. The result is represented in the same Q15 format. Any other level of quantisation can be implemented, where appropriate, although Q15 is a commonly used format.

Some examples of decimal values and the equivalent Q15 value (in decimal) are shown below.

| Real Values | Q15 |
|---|---|
| 0.5 | 16384 |
| 1 | 32767 |
| −1 | −32768 |

The Q15 value is then converted to a decimal value for input into the divider. Some examples of division using Q15 format are as follows:

| Real Values | Q15 Implementation |
|---|---|
| 0.25/0.5 = 0.5 | 8192/16284 = 16284 |
| 0.5/0.9 = 0.5555556 | 16284/29490 = 18204 |

The Q15 representation is shown in decimal for clarity, however, a divider operates with Q15 represented numbers in a binary format.

The arithmetic operation of dividing two numbers presents a considerable problem in most DSPs or more generally, embedded system implementations. Most processing units do not have an instruction set to execute division. For example, the TI 5402 DSP, does not have a direct instruction for division. Division is implemented indirectly via the special subtraction instruction. Fast division (parallel implementation) requires many logic cells/gates involving large areas of silicon. That is why the "slow" series implementation algorithms, which use few logic gates, are very popular and mostly used in industry. These are cheaper and take up less room than parallel implementations, due to the lesser number of logic gates required.

For example, in the industry, a standard approach is commonly implemented in an ALTERA™ FPGA. ALTERA™ provides several design solutions to achieve division, however, these do not produce results in Q15 precision. The parallel implementation takes around 1200 logic cells and executes in one cycle. While obviously this is time efficient, the implementation requires a lot of silicon "real estate". The serial divider proposed by ALTERA™ takes approximately 120 logic cells and executes in 32 cycles. Both solutions present only core division operation. Further logic, comprising approximately 100-200 logic cells, is required for interfacing, sign correction, saturation and presentation in Q15. For example, the serial implementation therefore needs a minimum of 350-400 logic cells, and executes in more than 32 cycles. While using significantly fewer gates than the parallel implementation, the execution time (in cycles) is much longer.

SUMMARY OF INVENTION

It is an object of the invention to provide a divider and/or division method that is capable of being implemented using fewer logic cells than a typical parallel divider implementation, but can execute the division operation more quickly than a typical serial divider implementation, or at least to provide an alternative to existing divider implementations. Additionally, the divider and/or method may be adapted to provide an arbitrary level of precision in the answer, and utilise input values of arbitrary precision.

In broad terms in one aspect the invention comprises a divider for dividing a dividend by a divisor including: a subtractor for subtracting the divisor from the dividend to produce a result, storage space with a preliminary answer, and a processor for revising the dividend and preliminary answer based on the result, wherein the divider is adapted to reiterate the subtraction and revision multiple times, based on a revised dividend and revised preliminary answer each iteration.

In broad terms in another aspect the invention comprises electronic hardware adapted to divide a dividend by a divisor including one or more electronic components for: a) subtracting the divisor from the dividend to produce a result, b) revising the dividend based on the result, c) revising a preliminary answer based on the result, d) repeating steps a)-c) until the preliminary answer reaches the desired precision to provide an answer to the division, and e) outputting or otherwise utilising the answer.

In broad terms in another aspect the invention comprises a method for dividing a dividend by a divisor including: subtracting the divisor from the dividend to produce a result, revising the dividend and a preliminary answer based on the result, and reiterating the subtraction and revision multiple times, based on a revised dividend and revised prelimi answer each iteration.

BRIEF LIST OF FIGURES

Preferred embodiments of the invention will be described with reference to the following Figures of which;

FIG. 2 shows a worked example of the division process; and

DETAIL DESCRIPTION OF THE PREFERRED EMBODIMENTS

Figure 1:
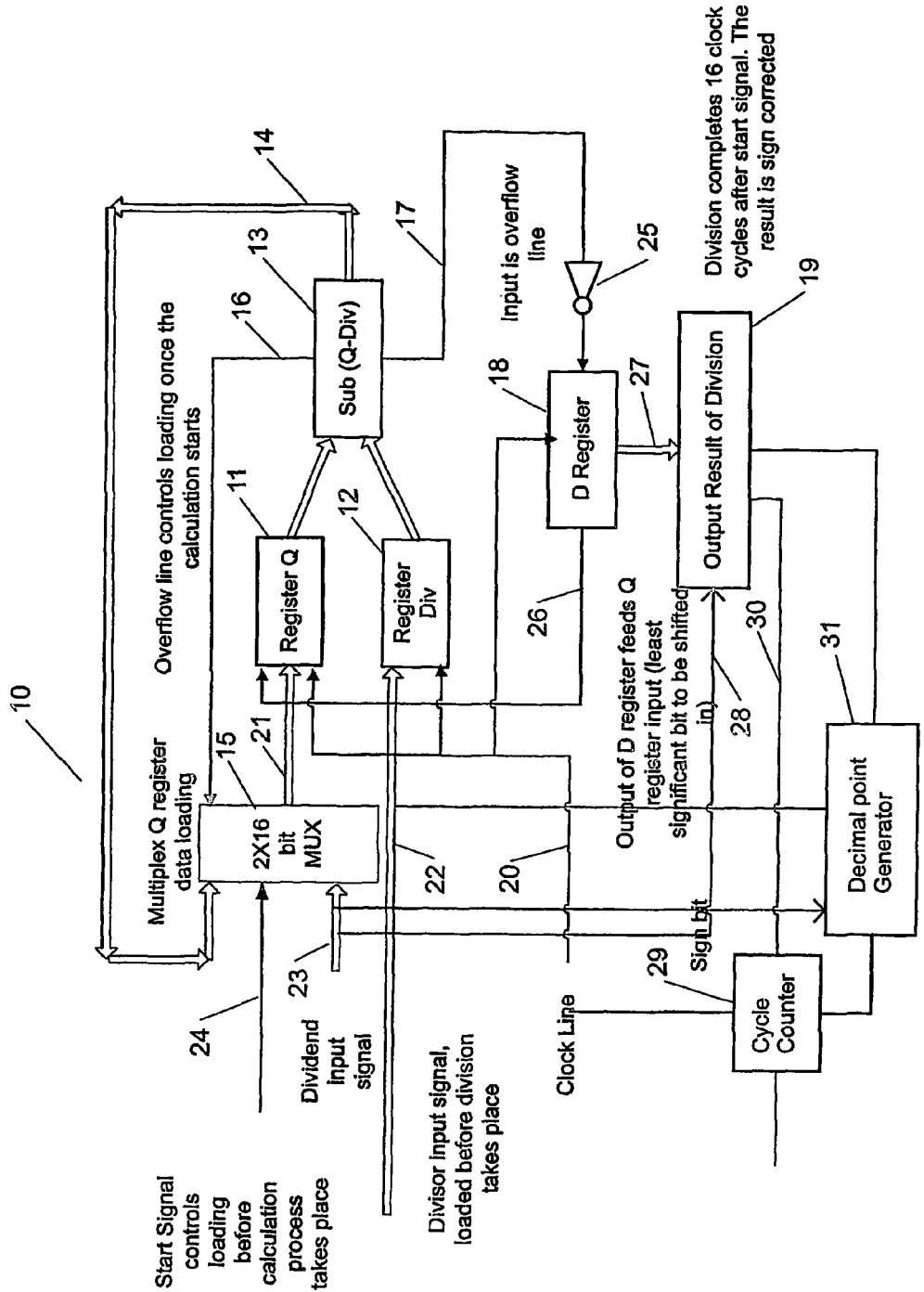
FIG. 1 is a block diagram showing the functional nature of a divider according to the invention.

Referring to the drawings it should be appreciated that a divider and associated method according to the invention could be implemented in different forms using a range of hardware technologies for various applications. The following embodiments are given by way of example only. It should also be appreciated that binary computations and the manner in which they are implemented are known to those skilled in this area of technology, and therefore no detailed description is required.

FIG. 1 is a block diagram of showing the general nature of a divider 10 according to the invention that could be used in a range of applications. It will be appreciated that the diagram illustrates the functional nature of the divider, which could be implemented using a wide range of digital hardware technologies such as an FPGA. Those skilled in the technology will understand how to implement the divider shown in FIG. 1, using a suitable technology for the particular application.

The divider includes Q and Div shift registers 11, 12 for storing a dividend and divisor respectively, in binary form. The divider also includes a D shift register 18 for storing an intermediary or preliminary answer to the division in binary, and an output register 19 for storing the quotient, or final answer in binary. Preferably, these are 16-bit registers for storing binary numbers in Q15 form, although other sized registers can readily be implemented as appropriate, if an alternative precision is required. The Q, Div and D registers 11, 12, 18 are coupled to a clock signal 20 for clocking the input. The Q register 11 receives its input value from a 16-bit multiplexer 15 upon clocking. On the input of the multiplexer 15 are an initial input dividend value 23, a feedback value 14, and a control line 24 for selecting an initial input value (dividend) 23. The Div register 12 receives its input value directly from a divisor input line 22. The Q and Div registers 11, 12 are coupled to a subtractor 13 arranged to, upon loading, subtract the value in the Div register 12 from the value in the Q register 11. The subtractor 13 can be implemented in any suitable manner known to those skilled in the technology.

The subtractor 13 outputs a result and overflow bit, which indicates whether the divisor is bigger than the dividend. In particular, a logical high overflow bit indicates that the divisor is bigger than the dividend, while conversely, a logical low overflow bit indicates that the dividend is bigger than the divisor. The output 14 of the subtractor 13 (that is, the result of the subtraction) is fed back to an input of the 16-bit multiplexer 15 along with the overflow bit, which is fed back to an input via a control line 16. The overflow bit on the control line 16 controls selection and loading of the subtractor output 14 into the Q register 11, via the multiplexer 15. More particularly, when the overflow feedback control line 16 is high, indicating that an overflow took place during subtraction, this instructs the multiplexer 15 to select the output 14 for passing to the Q register 11. When the overflow line 16 is logical low, the subtractor output 14 on the input to the multiplexer 15 is unselected, and the Q register 11 is not loaded.

The overflow bit is also placed on a data line 17, which is coupled to the input of the least significant bit of the D register 18 via an inverter 25. The output line 26 from the shift overflow of the D register 18 is coupled to an input of the least significant bit of the Q register 11. The output 27 of the entire D register 18 is coupled to an input of the output register 19. A sign bit 28 from the dividend input line 23 is also coupled to an input of the output register 19.

A preferred method of conducting a division operation in accordance with the invention will be described with reference to FIG. 1. A dividend and a control signal are loaded into the multiplexer 15 on the dividend and control input lines 23, 24 respectively. The control signal instructs the multiplexer 15 to select the dividend line 23 and direct the dividend value to the input 21 of the Q register 11, which loads the value on the next clock cycle. A divisor is placed on the input line 22 to the Div register 12, which loads the divisor value on the next clock cycle. The D and output registers 18, 19 initially contain all zeros. On the next clock cycle, the Q register 11 is left shifted 1 bit (effectively multiplying the stored value by 2) and the most significant bit is shifted out of the Q register 11 and discarded. On the same cycle, the most significant bit shifted out of the D register 18 is loaded into the least significant bit of the Q register 11. This is effectively the same as adding the most significant binary digit to the Q register value 11. The values in the Q and Div registers 11, 12 are then loaded into the subtractor 13 on the next clock cycle, after which the subtractor calculates the result and overflow of the Q register value (initially the dividend) minus the Div register value (divisor) using any suitable method.

On the final clock cycle of the subtraction, the overflow bit is placed on the input line 17 to D register 19, and the complement formed by inverter 25. In the same cycle, the overflow bit is also placed on the feed back control line 16 to the multiplexer 15, and the result of the subtraction 14 is fed back to one input of the multiplexer 15. On the next clock cycle, several operations are carried out. The value in the D register 18 is shifted left one bit, effectively performing a multiplication by two. The inverted overflow bit is input to least significant bit of the just shifted D register 18 (effectively adding one to the shifted D register value), and the most significant bit, which is removed from the D register 18 by the shift operation, is placed on the input 26 to the least significant bit of the Q register 11. The D register then contains a preliminary answer to the division. The Q register 11 value is also revised or updated beginning with this clock cycle. More particularly, if no overflow took place during the subtraction, the overflow control line 13 is high and instructs the multiplexer 15 to select the input line 14 with the subtraction result, and pass this result through the output of the multiplexer 15 to the input of the Q register 11. If no overflow took place, the control line 16 is low, and prevents the fed back result 14 being loaded into the Q register 11. Rather, the present value in the Q register 11 is retained. On the next cycle, the value on the input to the Q register 11 is loaded in.

This completes one iteration of the division cycle, and the divider 10 is then set up to carry out another iteration, if required, beginning with left shifting the value in the Q register 11 and loading into the least significant bit, the most significant bit shifted out of the D register 18, as explained above. As mentioned previously, the D register 18 contains an intermediary answer to the division. This can be refined by further iterations of the division cycle, each one revising the preliminary answer in the D register 18, until an answer to the desired precision is obtained. So, for example, to get a Q15, 16-bit precision answer, the divider would carry out sixteen iterations of the method. Any arbitrary level of precision in the answer can be obtained by reiterating the cycle the required number of times. Once the desired precision is reached, the contents of the D register are loaded into the output register 19. The cycle counter 29 receives input indicating the required precision of the answer, and monitors the number of iterations that are carried out by the divider 10. Once the required number of iterations is reached, it instructs the D register 18 to load its current value into the output register 19, and instructs the divider 10 to cease. At this point, additional processing logic 31 is instructed to insert a decimal point at the required location in the output value 19, based on the number of division cycles carried out, and the precision of the input dividend 23 and divisor 22. The additional logic 31 design will be known to those skilled in this technology, and need not be described here. The sign bit 30 is also specified, based upon the sign of the input values 23, 22. The divider 10 enables input values of arbitrary precision to be processed by the divider to obtain a result of arbitrary precision. From here, the result in the output register 19 can be used as required.

The core divider 10 according to the invention can be implemented in approximately 110 logic cells and executes in 15 cycles. A complete solution can be implemented using 202 logic cells, which executes in 16 cycles, and provides full interface, sign correction, saturation, produces the desired result in case of division by zero, and produces the result in desired Q15 fixed point presentation. Obviously the complete solution could be altered if another presentation and precision other than Q15 is required. The divider 10 according to the invention can be ported in any other application where fixed point division is required. The input parameter defines the number of bits used for decimal portion of the value. If a larger accuracy, of for example Q32, is required, implementation can readily be achieved without a significant increase in logic cell requirements.

FIG. 2 shows a worked example that illustrates the manner in which the divider 10 carries out division of 0.4 by 0.6. This example will also be described with reference to FIG. 3. For simplicity, Q4 representation is used, whereby 4 bits of precision are used to represent the dividend and divisor. Therefore, $2^4=16$ levels of quantisation are used to represent the number and one bit is used for the sign. In practice, 15 levels are actually used for numbers between 0 and 1 (resulting in $1/15=0.0666$ per quantisation), and 16 levels for numbers between −1 and 0 (resulting in $1/16=0.0625$ per quantisation. The answer to 0.4/0.06 in decimal is 0.666. In Q4 format, 0.4 (dividend) becomes 0.4×15=6, which is 0110 in binary. Similarly, in Q4 format, 0.6 (divisor) becomes 0.6×15=9, which is 1001 in binary. The answer 0.666 (quotient) in Q4 format is 0.666×15=10, which is 1010 in binary.

First of all, the dividend, 0110, is loaded into the Q register 11 and the divisor, 1001, is loaded into the Div register 12. Initially both the D and output registers 18, 19 contain all zeros. This is shown in step 32 of FIG. 3. The Q and D registers 11, 18 are then left shifted, and the zero from the most significant bit of the D register 18 is loaded into the least significant bit of the Q register 11 (as shown in step 33 of FIG. 3), such that the registers are as follows:

| Q = 1100 | D = 0000 |
|---|---|
| Div = 1001 | O = 0000 |

Div is then subtracted from Q in the subtractor 13, to produce the result 0011 as shown in step 34. There is no overflow as Div is less than Q, so when D register 18 is left shifted, a "1" (inverse of overflow bit) is loaded into the least significant bit of D register 18. This is the same as asking whether the value in the Q register is greater than a value in the Div register so in this step the yes arrow is followed from question box 35 to box 36. Further, as there is no overflow, the result, 0011, is loaded into Q register 11, it is left shifted, and the most significant bit (MSB) of D register, 0, that was shifted out is loaded into the least significant bit (LSB) of Q register 11, resulting in the value 0110. No change takes place to the Div and 0 registers 12, 19. These steps are shown in step 38 of FIG. 3. The counter is then incremented at step 40. If the counter indicates that the specified precision has been reached the yes arrow is followed from question box 41. After this iteration the required precision hasn't been reached so the no arrow is followed from question box 41 to step 34. The registers are therefore, at the beginning of iteration 2:

| Q = 0110 | D = 0001 |
|---|---|
| Div = 1001 | O = 0000 |

Figure 3:
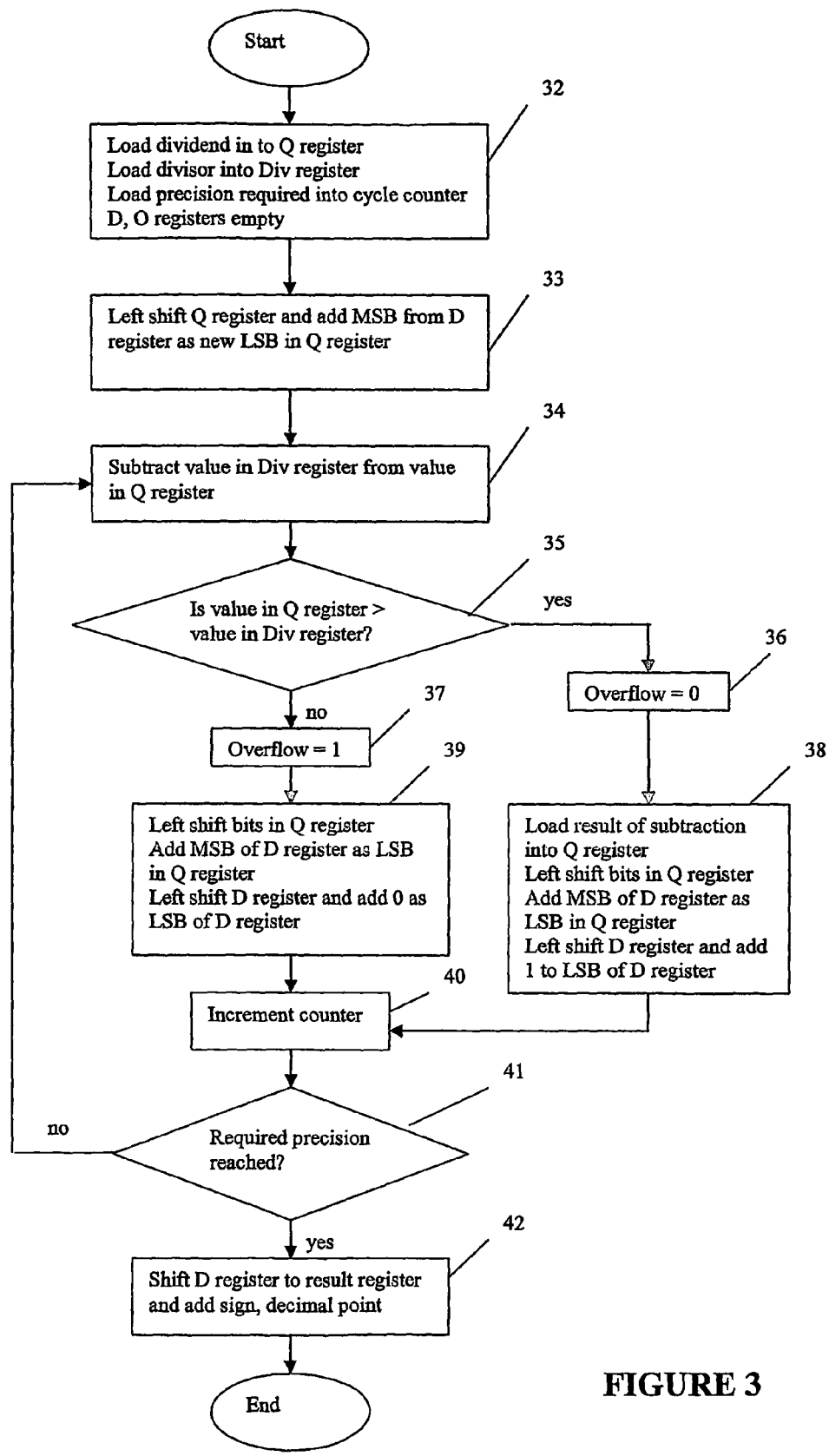
FIG. 3 is a flow chart of the division process.

Div is then subtracted from Q in the subtractor 13, to produce the result 0011 as shown in step 34 of FIG. 3. There is overflow as Div is greater than Q, so when D register 18 is left shifted, a "0" (inverse of overflow bit) is loaded into the least significant bit of D register 18. Further, as there is overflow, the result, 0011, is not loaded into Q register 11, but rather the existing value, 0110 is left shifted, and the most significant bit of D register, 0, that was shifted out is loaded into the least significant bit of Q register 11, resulting in the value 1100. No change takes place to the Div and O registers 12, 19. These steps are shown in step 39 of FIG. 3. The counter is then incremented at step 40. After this iteration the required precision hasn't been reached so the no arrow is followed from question box 41 to step 34. The registers are therefore, at the beginning of iteration 3:

| Q = 1100 | D = 0010 |
|---|---|
| Div = 1001 | O = 0000 |

Again, Div is subtracted from Q to produce the result 0011. There is no overflow so when D register 18 is left shifted, a "1" is loaded into the least significant bit. The result, 0011, is loaded into Q register 11, is left shifted, and the most significant bit of D register, 0, is loaded into the least significant bit of Q register 11, resulting in the value 0110. No change takes place to the Div and 0 registers 12, 19 as shown by step 38 of FIG. 3. The registers are therefore, at the beginning of iteration 4:

| Q = 0110 | D = 0101 |
|---|---|
| Div = 1001 | O = 0000 |

Div is subtracted from Q to produce the result 0011. There is overflow as Div is greater than Q, so when D register 18 is left shifted, a "0" (inverse of overflow bit) is loaded into the least significant bit of D register 18 as shown in step 39 of FIG. 3. At step 41 the desired precision is now reached, the division cycle can cease, and the value in the D register, 1010 can be loaded into the output register 19 for use as shown in step 42. The final register values are:

| Q = 1100 | D = 1010 |
|---|---|
| Div = 1001 | O = 1010 |

The output register value when converted from Q4 format to decimal becomes 0.666, the answer to 0.4/0.6. As explained earlier, the division process can be carried out for more (or fewer) cycles if a different precision is required for the answer. Where more than four steps are carried out, the additional circuitry 31 (of FIG. 1) inserts a decimal place in the output register value as appropriate (shown in step 42 of FIG. 3). It bases this on the dividend and divisor values, and the number of iterations carried out.

The divider can be implemented in any application where division functionality is required. For example, in telecommunications, it could be utilised in FM modulation/demodulation circuitry and/or in frequency estimation circuitry, such as that described in NZ524537 and/or NZ524369. It will be appreciated that the divider could also be implemented in many other technology fields.

The foregoing describes the invention including preferred forms thereof. Alterations and modifications as will be obvious to those skilled in the art are intended to be incorporated in the scope hereof as defined by the accompanying claims.

I claim:

1. A divider for fixed point division comprising:
   a first storage space with a divisor;
   a second storage space with a dividend or revised dividend;
   a third storage space with a preliminary answer, initialized to zero;
   a subtractor for subtracting the divisor from the second storage space to produce a result; and
   a processor for computing an answer to the division of the divider by revising the dividend and preliminary answer during a number of iterations of the subtractor until a required precision is reached, wherein the revising includes:
   in the event of no overflow from the subtractor, left shifting the result 1 bit, removing the most significant bit of the result, left shifting the preliminary answer in the third storage space 1 bit, removing the most significant bit of the preliminary answer, loading the least significant bit of the result with the most significant bit of the preliminary answer, loading 1 into the least significant bit of the preliminary answer, and storing the revised result in the second storage space;
   in the event of overflow from the subtractor, left shifting the dividend 1 bit, removing the most significant bit of the dividend, left shifting the preliminary answer in the third storage space 1 bit, removing the most significant bit of the preliminary answer, replacing the least significant bit of the dividend with the most significant bit of the preliminary answer, loading 0 into the least significant bit of the preliminary answer, and storing the revised dividend in the second storage space; and,
   wherein upon completion of the iterations, the divider is adapted to output the preliminary answer in the third storage space as the answer to the division;
   wherein the divisor and the dividend are in the range (−1, 1); and
   wherein the divider is adapted to insert a decimal place in the answer.

2. A divider according to claim 1 wherein the dividend, result and preliminary answer are in binary form and the processor is adapted to revise the dividend by:
   in the event of no overflow from the subtractor,
   a) multiplying the result by 2, removing the most significant bit, and adding the binary digit from the most significant bit of the preliminary answer, and storing in the second storage space
   or,
   in the event of overflow from the subtractor,
   b) multiplying the dividend by 2, removing the most significant bit, and adding the binary digit from the most significant bit of the preliminary answer, and storing in the second storage space.

3. A divider according to claim 2 wherein the processor is adapted to determine the revised preliminary answer by:
   multiplying the preliminary answer in the third storage space by 2,
   removing the most significant bit, and
   additionally, in the event of no overflow from the subtractor, adding 1.

4. A divider according to claim 1 adapted to reiterate the subtraction and revision until the preliminary result has the desired precision to provide the answer to the division.

5. A divider according to claim 4 adapted to reiterate subtraction and revision the same number of times as bits of precision required in the answer.

6. A divider according to claim 1 wherein the storage spaces are registers.

7. Electronic hardware adapted to divide a dividend by a divisor in a fixed point representation including one or more electronic components for:
   storing a divisor in a first storage space,
   storing a dividend in a second storage space,
   storing a preliminary answer initialized to zero in a third storage space,
      subtracting the divisor from the dividend to produce a result, and
      computing an answer to the division of the divider by revising the dividend and preliminary answer during a number of iterations of the subtracting step until a required precision is reached, wherein the revising step includes:
   in the event of no overflow from the subtractor, left shifting the result 1 bit, removing the most significant bit of the result, left shifting the preliminary answer in the third storage space 1 bit, removing the most significant bit of the preliminary answer, loading the least significant bit of the result with the most significant bit of the preliminary answer, loading 1 into the least significant bit of the preliminary answer, and storing the revised result in the second storage space;
   in the event of overflow from the subtractor, left shifting the dividend 1 bit, removing the most significant bit of the dividend, left shifting the preliminary answer in the third storage space 1 bit, removing the most significant bit of the preliminary answer, replacing the least significant bit of the dividend with the most significant bit of the preliminary answer, loading 0 into the least significant bit of the preliminary answer, and storing the revised dividend in the second storage space; and
   upon completion of the iterations, outputting the preliminary answer in the third storage space as the answer to the division;
   wherein the divisor and the dividend are in the range (−1, 1); and
   wherein the divider is adapted to insert a decimal place in the answer.

8. A method for dividing a dividend by a divisor to provide an answer, comprising the steps of:
   storing the divisor and dividend in first and second storage spaces in a memory;
   subtracting the divisor from the dividend in a subtractor circuit to produce a result,
   revising the dividend and a preliminary answer initialised to zero based on the result, and storing the revised dividend in the second storage space in the memory,
   storing the preliminary answer in a third storage space in the memory, and reiterating the subtracting and revising steps multiple times until a required precision is reached, based on a revised dividend and revised preliminary answer obtained each iteration, wherein the dividend, result, and preliminary answer are in binary form and the dividend and preliminary answer are revised by:

a) in the event of no overflow from the subtraction, left shifting the result 1 bit, removing the most significant bit of the result, left shifting the preliminary answer 1 bit in the third storage space in the memory, removing the most significant bit of the preliminary answer, loading the least significant bit of the result with the most significant bit of the preliminary answer, loading 1 into the least significant bit of the preliminary answer, and storing the revised result in the second storage space; or b) in the event of overflow from the subtractor circuit, left shifting the dividend 1 bit, removing the most significant bit of the dividend, left shifting the preliminary answer 1 bit in the third storage space in the memory, removing the most significant bit of the preliminary answer, replacing the least significant bit of the dividend with the most significant bit of the preliminary answer, loading 0 into the least significant bit of the preliminary answer, and storing the revised dividend in the second storage space;

outputting the preliminary answer from the third storage space as the answer upon ceasing the reiterations; and inserting a decimal place in the answer;

wherein the divisor and the dividend are in the range (−1,1).

9. A method for dividing according to claim 8 wherein the dividend, result and preliminary answer are in binary form and the dividend is revised by:

in the event of no overflow from the subtraction,
  a) multiplying the result by 2, removing the most significant bit of the dividend in the second storage space in memory, and adding the binary digit from the most significant bit of the preliminary answer memory to the second storage space in memory, or, in the event of overflow from the subtraction,
  b) multiplying the dividend by 2, removing the most significant bit, of the dividend in the second storage space in memory and adding the binary digit from the most significant bit of the preliminary answer memory to the second storage space in memory.

10. A method for dividing according to claim 9 wherein the preliminary answer is revised by:

multiplying the preliminary answer by 2, removing the most significant bit, of the preliminary answer memory and in the event of no overflow from the subtractor, adding 1 to the preliminary answer memory.

11. A method of dividing according to claim 10 further comprising reiterating subtraction and revision until the preliminary result has the desired precision to provide the answer to the division.

12. A method of dividing according to claim 11 further comprising reiterating the subtraction and revision the same number of times as bits of precision required in the answer.

* * * * *